(12) United States Patent
Wedell et al.

(10) Patent No.: US 7,604,770 B2
(45) Date of Patent: *Oct. 20, 2009

(54) METHOD OF PRODUCING A FILM MADE OF A THERMOPLASTIC MATERIAL

(75) Inventors: Eike Wedell, Siegburg (DE); Helmut Meyer, Troisdorf (DE)

(73) Assignee: Reifenhäuser GmbH & Co. Maschinenfabrik, Troisdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/980,990

(22) Filed: Oct. 31, 2007

(65) Prior Publication Data

US 2008/0128935 A1 Jun. 5, 2008

Related U.S. Application Data

(62) Division of application No. 10/869,023, filed on Jun. 16, 2004, now Pat. No. 7,479,003.

(60) Provisional application No. 60/479,211, filed on Jun. 17, 2003.

(30) Foreign Application Priority Data

Jun. 17, 2003 (DE) .......................... 203 09 429 U
Sep. 5, 2003 (DE) .............................. 103 41 508

(51) Int. Cl.
*B29C 47/90* (2006.01)
(52) U.S. Cl. .................................... 264/564
(58) Field of Classification Search ............. 264/564, 264/565, 566, 569; 425/326.1
See application file for complete search history.

(56) References Cited

U.S. PATENT DOCUMENTS

| | | | |
|---|---|---|---|
| 3,008,185 A | 11/1961 | Goldman | |
| 3,097,971 A | 7/1963 | Carlisle et al. | |
| 3,321,563 A | 5/1967 | Rettig et al. | |
| 3,950,466 A | 4/1976 | Hasler | |
| 4,017,575 A | 4/1977 | Heyer | |
| 4,176,775 A | 12/1979 | Brendemuehl | |
| 5,128,076 A * | 7/1992 | Akselrod et al. | 264/412 |
| 5,423,468 A | 6/1995 | Liedtke | |
| 5,979,731 A | 11/1999 | Long et al. | |
| 6,398,534 B1 | 6/2002 | Fachling et al. | |

FOREIGN PATENT DOCUMENTS

| | | |
|---|---|---|
| DE | 21 56 079 C2 | 7/1983 |
| DE | 199 12 209 A1 | 9/2000 |
| EP | 0 273 739 | 7/1988 |
| EP | 1 144 292 B1 | 4/2003 |
| WO | 03/033241 A1 | 4/2003 |

* cited by examiner

*Primary Examiner*—Robert B Davis
(74) *Attorney, Agent, or Firm*—Pauley Petersen & Erickson

(57) ABSTRACT

A method and a device for producing a film made of a thermoplastic material, wherein a plastic melt is blown up into a film bubble and is shaped into a desired film by a calibrating arrangement, and a downstream arranged flattening device. For providing as contactless as possible a guidance, calibration and flattening, film guidance elements are used with a laminar uniform air cushion between the film guidance element and the surface of the film bubble, without contact between the surface of the film bubble and the film guidance element.

10 Claims, 8 Drawing Sheets

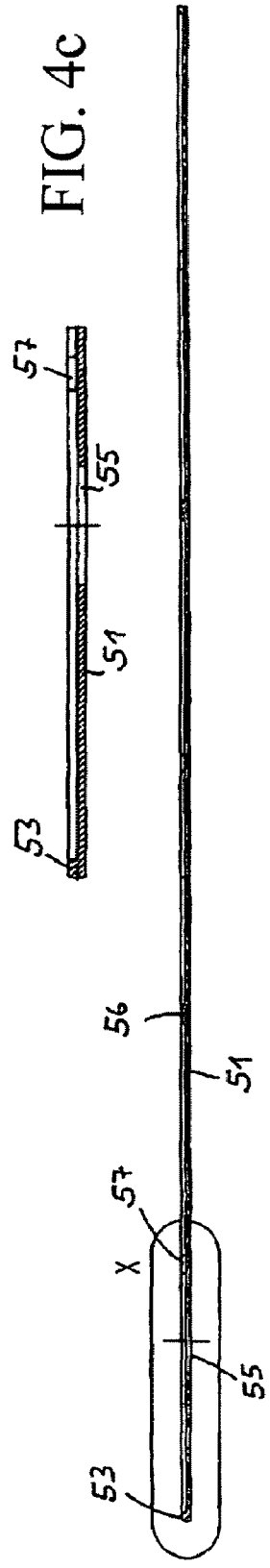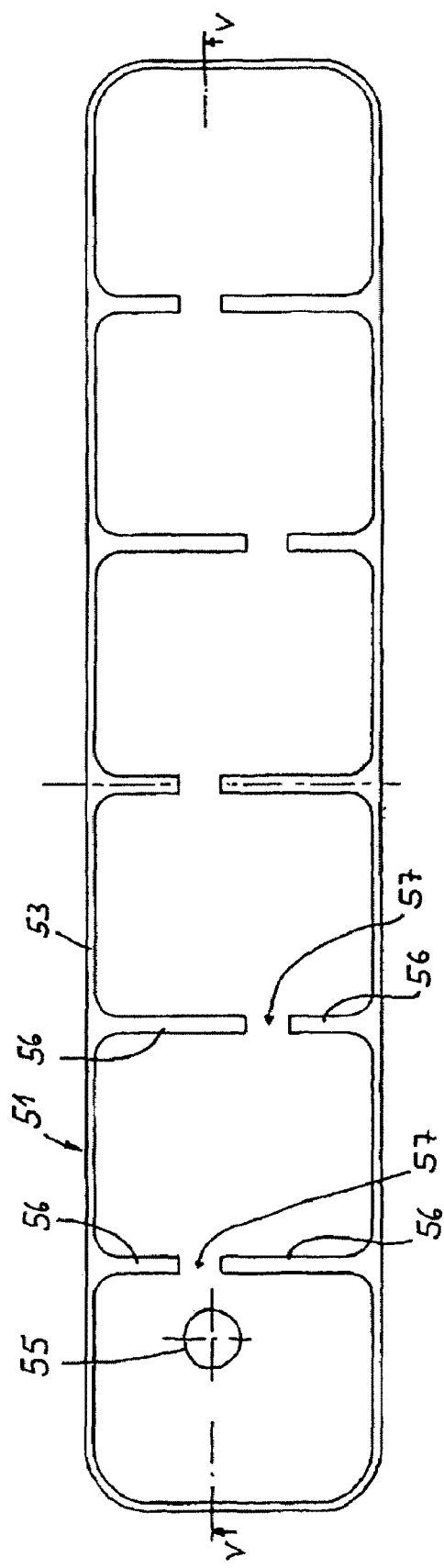
FIG. 4c
FIG. 4b
FIG. 4a

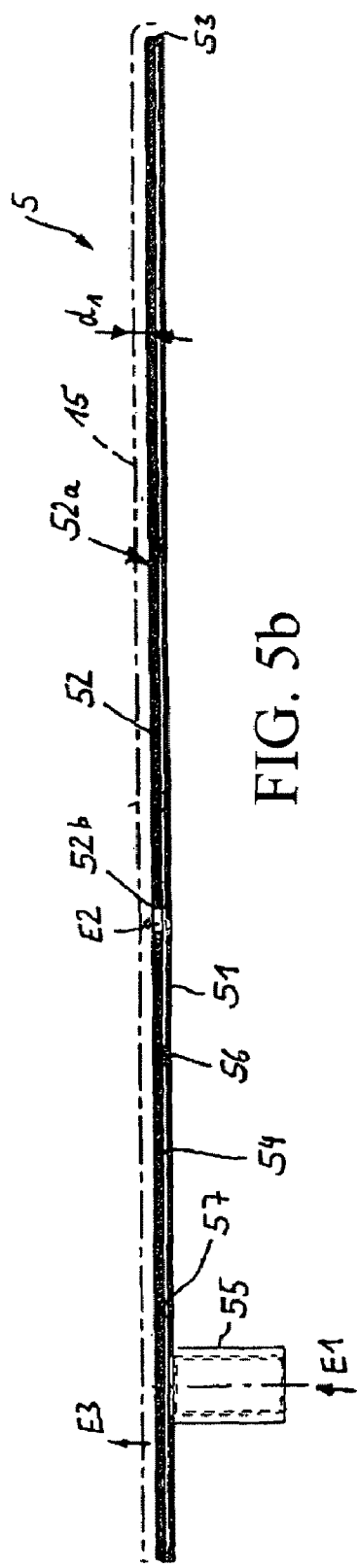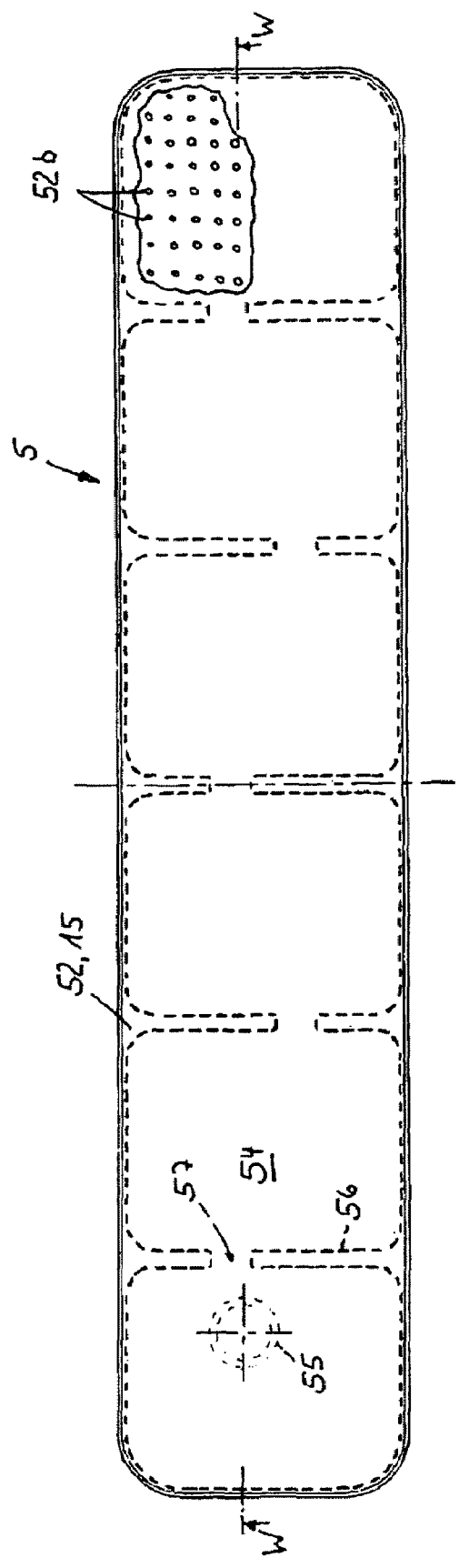
FIG. 5b
FIG. 5a

METHOD OF PRODUCING A FILM MADE OF A THERMOPLASTIC MATERIAL

CROSS REFERENCE TO RELATED APPLICATION

This application is a divisional of U.S. patent application, Ser. No. 10/869,023, filed on 16 Jun. 2004 now U.S. Pat. No. 7,479,003, and claims priority to German Patent Application 203 09 429.8, filed on 17 Jun. 2003, and claims priority to German Patent Application 103 41 508.4, filed on 05 Sept. 2003, and claims priority to U.S. Provisional Patent Application 60/479,211, filed on 17 Jun. 2003. The co-pending U.S. patent application 10/869,023 is hereby incorporated by reference herein in its entirety and is made a part hereof, including but not limited to those portions which specifically appear hereinafter.

BACKGROUND OF THE INVENTION

1. Field of the Invention

This invention relates to a method for producing a film made of a thermoplastic material, wherein a melt of a plastic material exits from a blow head supplied by at least one extruder, while forming a film bubble, and then the film bubble passes through a calibrating arrangement, in which it is calibrated to a predeterminable diameter, as well as afterwards is flattened into a film web in a flattening device, and then is rolled up, for example. This invention also relates to a device for producing a film made of a thermoplastic material, having at least one extruder with a blow head for the emergence of a film bubble from the plastic material, a calibrating arrangement acting on the exterior of the film bubble, and a flattening device for the film bubble arranged downstream of the calibrating arrangement, wherein the calibrating arrangement and/or the flattening device have film guidance elements, which can be charged with an airflow, and wherein air outlet openings for the exit of the supplied air flow are provided in the area of the surface of the film guidance elements facing the film bubble.

2. Discussion of Related Art

Production processes for the manufacture of films, also called blown films, from a thermoplastic material are known.

The thermoplastic, such as a molten state as the plastic material emerges from the customarily ring-shaped opening of the blow head and is immediately blown up in to a film bubble, hardens while cooling below the solidification temperature. The film bubble is also guided through a calibrating arrangement and its diameter is calibrated, and then it is flattened by a flattening device into a double film and wound up thereafter.

In this case the calibrating arrangement is customarily embodied in the shape of a so-called calibrating basket, which surrounds the exterior of the film bubble as a cylinder and includes a plurality of calibrating arms, which are in contact on the outside with the circumference of the film bubble in order to fix its diameter and to calibrate it. For example, the calibrating arms can have a plurality of rotatable plastic rollers, which roll off on the surface of the film bubble and simultaneously calibrate it. Embodiments with rotating brushes or the like are also known. Customarily, the calibrating arms of such a calibrating basket are adjustably held, so that various diameters of the film bubble can be set and calibrated.

These known methods are distinguished because during its passage through the calibrating arrangement, the film bubble contacts the calibrating device, for example the calibrating arms and the plastic rollers fastened thereon, because direct contact with them occurs. However, this contact of the calibrating arrangement with the film, which has not yet been completely cooled and solidified in the area of the calibrating arrangement, is disadvantageous, for example when producing highly transparent or tacky film, because respective running marks can form on the film with this contact, which then has a negative effect on the visual appearance of the finished film. In case of tacky films, a blockage of the calibrating arrangement might even occur, which afterwards results in damage to the film bubble and a corresponding involuntary production stoppage.

The above remarks apply in the same way to the flattening device arranged downstream of the calibrating arrangement, in which the film, with a diameter that has already been calibrated, is flattened into a film web.

Therefore a calibration and/or flattening of the film bubble without a possible contact with it can be of considerable advantage in particular applications. European Patent Reference EP 0 273 739 A1 teaches guiding the film bubble in a contactless manner between strong air flows acting on the inside and outside of the film bubble to prevent contact friction causing the surface blemishes of the film bubble. However, the cost outlay for an apparatus with high-output blowers, air conduits, as well as an appropriate control technology, is very great, and there is a problem with too strong air flows causing undesirable temperature effects on the film bubble might occur, which negatively affect the quality of the film obtained.

Furthermore, a device for contactless guidance or treatment of a running web of material, for example a plastic film, is taught by European Patent Reference EP 1 144 292 B1, wherein a gaseous fluid for guiding the film exits from a chamber, wherein the gas-permeable wall is made of a metal-containing plastic material with open pores. However, the known device is employed for guiding a web of already great stability through a coating device.

SUMMARY OF THE INVENTION

It is one object of this invention to provide a method for producing a film made of a thermoplastic material, wherein a contactless calibration and flattening of the film web which, particularly during calibration, has not yet completely solidified and hardened, while avoiding the disadvantages of the prior art.

To attain this object, a method in accordance with the characteristics taught in this specification and in the claims is proposed, wherein the air flow exits the surface of the film-guidance element facing the film bubble in the form of a laminar air flow and forms a laminar air cushion for the film bubble.

This method has a realization that in connection with the film guide elements employed up to now in the calibrating arrangement and/or the flattening device, the air flow always exits in the form of a turbulent air flow from the air outlet openings arranged at defined distances from each other because of the high air speed and mass throughputs required for the formation of the air cushion, and permits the creation of an inhomogeneous air cushion, so that uniform calibration and flattening of the film bubble cannot be effected, and also contacts between the calibrating arrangement and/or the flattening device and the film bubble cannot be avoided over the long run.

In accordance with one embodiment of this invention, a laminar air cushion is created between the film guidance elements of the calibrating arrangement and/or the flattening device, and an extraordinarily uniform support of the film bubble occurs, which assures high product quality, while dependably avoiding any contact at all between the film guidance element and the film bubble. Thus it is possible with the method in accordance with this invention to provide a film web with great adhesive effect on the basis of composite EVA structures, composite PIB structures, composite structures with ionomers in PE-LLD films, and the like.

In accordance with this invention, the surface of the film guidance element facing the film bubble is formed by an air-permeable microporous layer, and the air flow guided to the film guidance elements is conducted through this microporous layer, wherein the microporous layer divides the airflow into a multitude of partial laminar flows, and the partial laminar flows each exit from the individual pores of the microporous layer in the direction of the film bubble and form the laminar air cushion.

For creating this laminar air flow, the air-permeable microporous layer advantageously has a mean pore size between 5 and 100 μm, wherein for obtaining a sufficient support function of the unstable film bubble which, because of having been blown up into a film bubble, is still ready to expand, a pore size between 30 and 100 μm is preferable.

According to this invention, one advantage is an extraordinarily low consumption of air and little operating noise. It is thus possible when charging the film guidance elements with an air flow of 0.5 to 4 bar to operate them with an air flow or throughput in the direction toward the film bubble corresponding only to 0.2 l/min dm² at 0.5 bar, and to 1.6 l/min dm² at 4 bar, wherein with even this low air throughput a contactless guidance is assured because of the formation of a laminar air cushion.

The device for producing a film made of a thermoplastic material has film guidance elements for the desired object of attaining a uniform, contactless calibration and/or flattening of the film bubble, whose surface facing the film bubble is embodied as an air-permeable microporous layer of a mean pore size of 5 to 100 μm.

It is within the scope of this invention for an air-permeable microporous layer, which faces the film bubble and is used for letting the air exit, to allow the air flow supplied to the film guidance elements to exit through a multitude of narrowest and closely adjoining micropores in such a fine distribution that an extremely uniform and constant air cushion is formed, so that the film bubble can be dependably calibrated and/or flattened without being touched, even if it develops a large tendency toward tackiness and large adhesive forces.

Because, in contrast to the guidance of an already solidified plastic film, the film bubble to be calibrated and/or flattened in the device of this invention is still unstable and has a tendency for expansion because of its having been widened, it is necessary for its dependable contactless calibration and/or flattening to exert a not inconsiderable force effect on the outer surface of the film bubble. However, this force effect can only occur if the air cushion used for the contactless guidance, calibration and flattening has a defined minimum intensity, which in particular occurs when embodying the air-permeable microporous layer with a mean pore size between 30 and 100 μm.

The microporous air-permeable layer used for forming the surface of the film guidance element facing the surface of the film bubble advantageously has a thickness of 0.5 to 2.0 mm, because with these layer thicknesses the desired fine distribution of the air flow, along with a simultaneously large air permeability, is assured.

The production of microporous layers of a mean pore size between 5 to 100 μm, preferably approximately 30 to 100 μm, required by this invention can occur in various ways. For example, the microporous layer can be produced on the basis of a powder mixture of several components with different melting temperatures.

The air-permeable microporous layer can be produced, in particular, of metal or ceramic components.

A preferred embodiment of the film guidance elements of this invention have a housing with a rear wall facing away from the film bubble and a front wall with air outlet openings facing the film bubble, as well as a circumferential wall, which connects the rear wall and the front wall and forms a closed air chamber. In this case the rear wall and the circumferential wall are embodied air-tight, while the air-permeable microporous layer is applied to the front wall with the air outlet openings on the side facing the film bubble, through which in the end the air flowing in through the air outlet openings in the front wall exits from the film guidance element in the direction toward the film bubble. An air inlet opening to the air chamber of the housing is provided near or in the area of the rear wall and/or the circumferential wall for supplying the air flow.

In one embodiment of this invention, the air chamber within the housing is divided by intermediate strips into partial chambers which communicate with each other and is used for distributing the supplied air flow.

The intermediate strips are connected with the rear wall, the same as the circumferential wall, wherein an embodiment of the rear wall with a circumferential wall formed integrally with the surface and facing the front wall, and intermediate strips is preferably provided. Such an integral embodiment of the circumferential wall and of the intermediate strips can be provided, for example, by milling partial areas near or in the area of the later partial chambers, or the like.

Then the front wall is placed on the circumferential wall and the intermediate strips and is welded along the circumferential wall so as to be air-tight, for example by laser welding. The intermediate strips can also be connected with the front wall by individual spot welds in order to increase sturdiness during the subsequent charging with a compressed air flow.

Finally, the intermediate strips also increase the stiffness of the rear wall, so that an extremely compact and dimensionally stable housing results. According to this invention, when producing the housing from a metallic material, consisting of a 2 mm thick rear wall, from which circumferential walls and intermediate strips of a height of 1 mm can be obtained by 1 mm deep milled areas, and a 2 mm thick front wall with air outlet openings, it is possible to obtain a two-part housing which offers a surprisingly good and uniform air distribution and formation of the desired air cushion.

Thus, a uniform homogeneous air cushion between the film bubble and the surface of the film guiding element facing it is created, having a size proportional to the interior pressure in the air chamber of the housing. Also, by dividing the air chamber by intermediate strips into partial chambers communicating with each other, there are no partial air cushion differences over the entire surface of the film guidance element facing the film bubble, so that an extraordinarily uniform contactless guidance and calibration, or flattening, of the film bubble is achieved.

BRIEF DESCRIPTION OF THE DRAWINGS

This invention is explained in view of exemplary embodiments represented in the drawings, wherein:

FIG. 4a is a top view of a rear wall of the housing of a film guidance element;

FIG. 4b is a section taken through the rear wall in accordance with the arrow V-V shown in FIG. 4a;

FIG. 4c shows a detail X of the representation in accordance with FIG. 4b, in an enlarged view;

FIG. 5a is a top view of a film guidance element;

FIG. 5b is a section taken through the film guidance element in accordance with FIG. 5a, along the line W-W;

DESCRIPTION OF PREFERRED EMBODIMENTS

Figure 1:
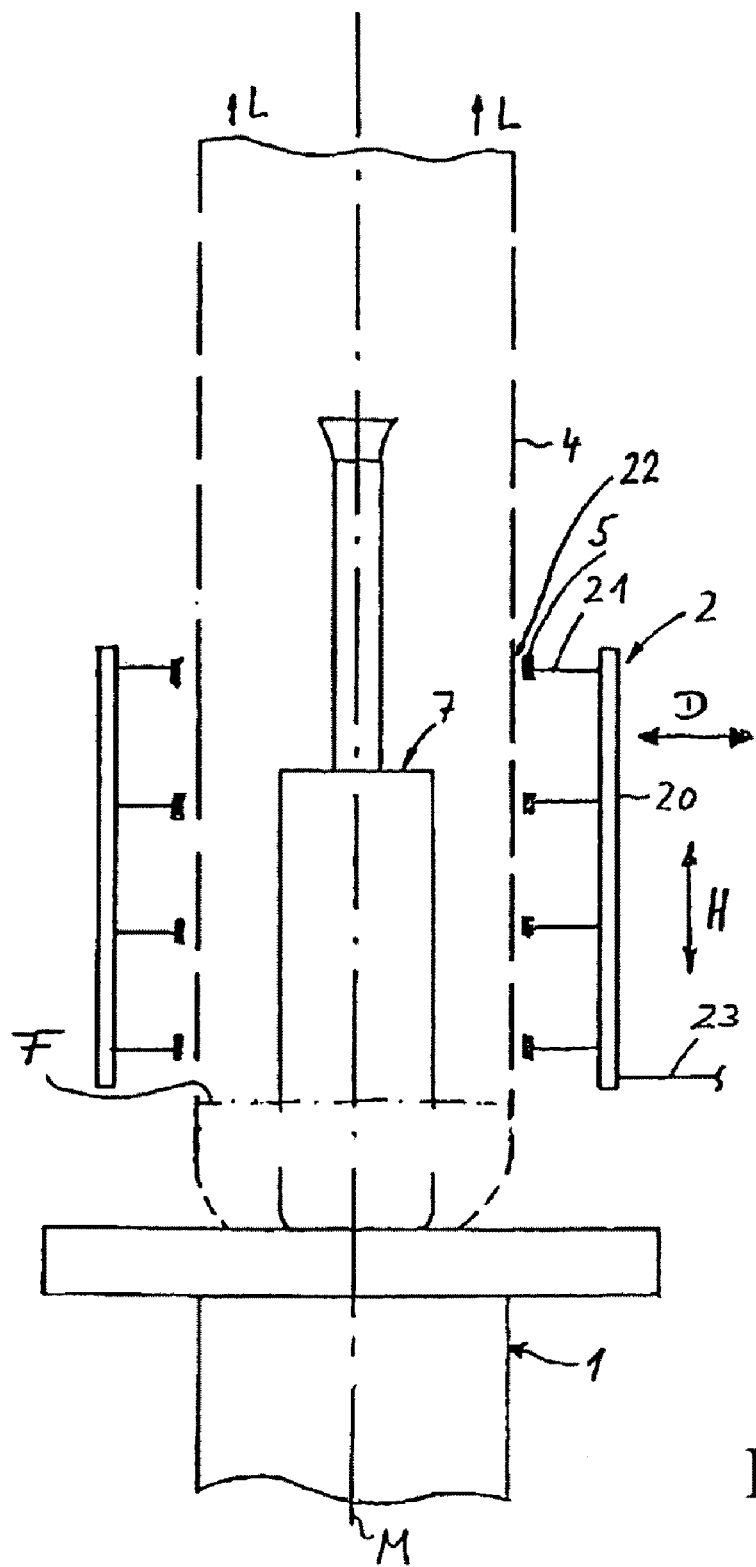
FIG. 1 is a schematic representation of a lateral view near or in the area of the blow head with a downstream-connected calibration arrangement of a device for producing a film.

The device for producing a film made of a thermoplastic material represented in FIG. 1 comprises a blow head 1, not represented in significant detail, which is charged in a known manner with a molten thermoplastic material from an extruder, not visible here. In a thermoplastic state, the plastic material exits the blow head 1 through a ring-shaped outlet opening at the top and is immediately blown into a film bubble 4 and moved vertically away toward the top in the direction of the arrow L. Therefore this film bubble 4 has a circular cross section with a center axis M.

Directly following its exit from the blow head 1, the plastic material forming the film bubble 4 is still in the thermoplastic state because of its high temperature, but is rapidly cooled to below its solidification temperature, because of which the film bubble 4 is slowly changed into a stable state. The transition between the thermoplastic and the solidified state of the film bubble 4 is identified by a so-called frost line indicated by the reference symbol F in FIG. 1.

The interior air exchanger 7 arranged in a known manner in the interior of the film bubble 4 and used for supporting the film bubble 4 on the inside can also be seen in FIG. 1.

Figure 6:
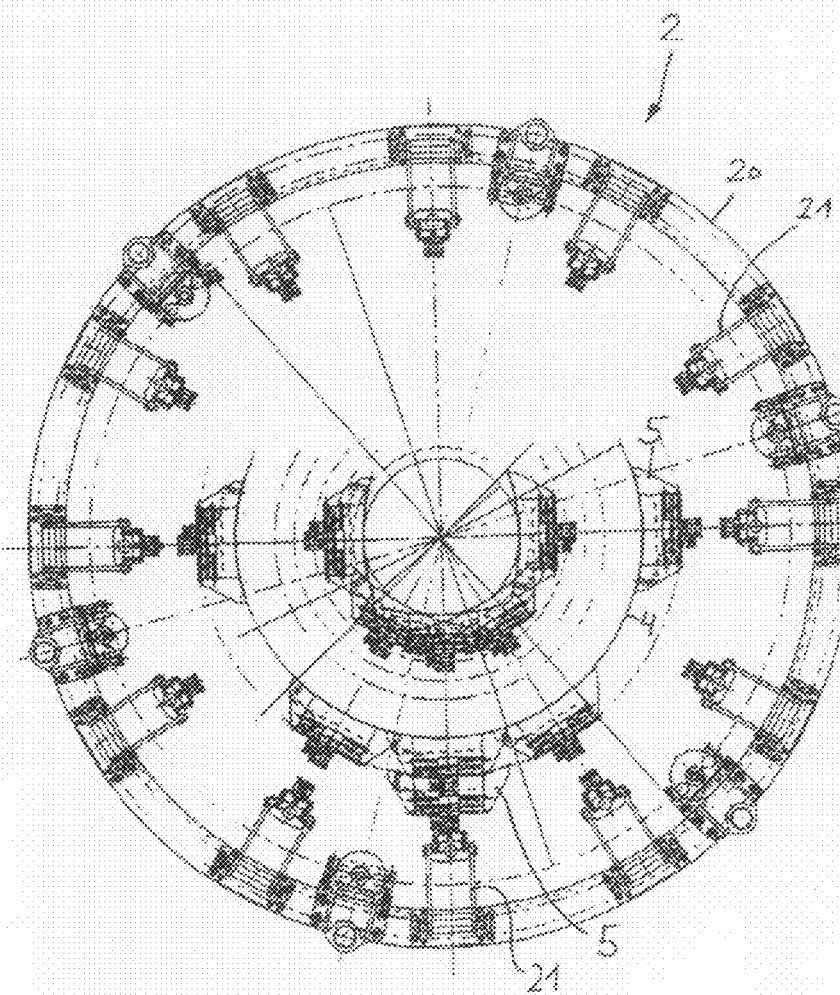
FIG. 6 is a top view of the calibrating arrangement, as shown in FIG. 1.
Figure 7:
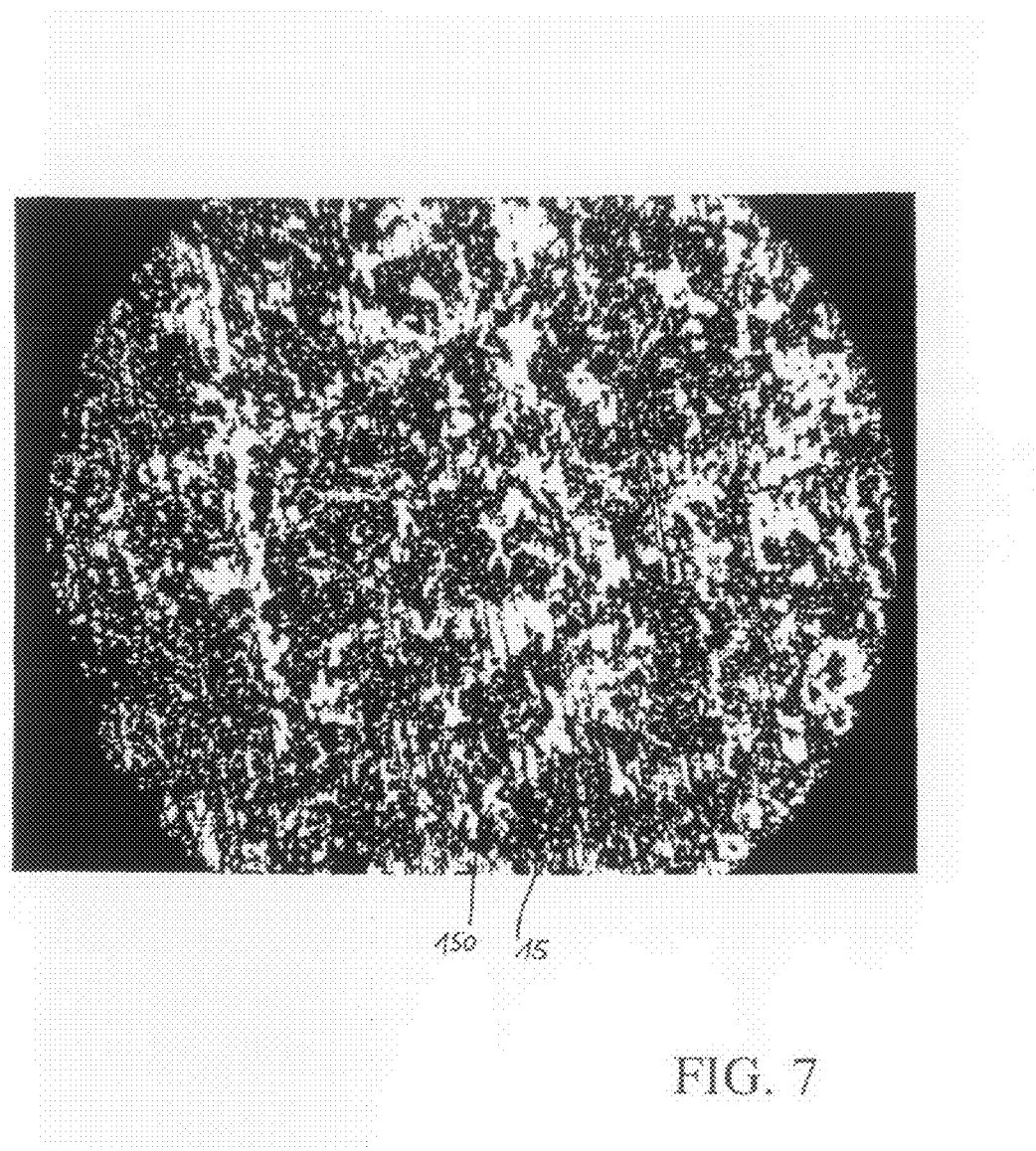
FIG. 7 is a microscopic photograph of the surface of the film guidance element facing the film bubble.

A calibrating arrangement 2 is arranged shortly above the blow head 1 and its further details are shown in the top view in accordance with FIG. 7. The calibrating arrangement 2 is used for fixing the diameter of the film bubble 4 with respect to the center axis M, for which purpose it acts from the outside in a radial direction on the circumference of the film bubble 4. The calibrating arrangement 2 has a calibrating basket 20 surrounding the circumference of the film bubble 4 for this purpose, on whose inside a multitude of support arms 21 are arranged in the direction toward the film bubble 4 passing through the calibrating arrangement 2. On their free end adjoining the outer circumference of the film bubble 4, the support arms 21 each have film guidance elements 5, whose number and arrangement is only schematically represented in FIG. 1, but whose actual arrangement around the circumference of the film bubble 4 at uniform spacings is shown in FIG. 6.

An individual film guidance element 5 fastened on the end of each support arm 21 adjoining the film bubble 4 is shown in various views in FIGS. 3a to 3d.

In its essential components, the film guidance element 5 comprises a housing 50 including a rear wall 51 and a front wall 52. In the installed position of the film guidance element 5 as shown in FIG. 6, the rear wall 51 faces away from the film bubble 4, while the front 52 of the housing 50 faces the film bubble 4.

The film guidance element 5 further comprises a fastening flange 58 connected with the rear wall 51 of the housing 50, by which the film guidance element 5 is fastened on the support arm 21 within the calibrating arrangement 2.

Further details of the basic structure of the rear wall 51 and the front wall 52 of the film guidance element 5 is also shown in the enlarged representations in accordance with FIGS. 4a to 4c and 5a and 5b.

The rear wall 51 of the film guidance element represented in a linear extension in FIGS. 4a to 4c is made of a metallic material impermeable to air, for example, and has a surrounding circumferential wall 53 along it surface facing the front wall 52, which is also formed air-tight and is welded to the rear wall 51, for example. In one embodiment, it is formed by milled-out portions or the like, while retaining the rear wall 51, for example it is formed integrally with it.

As also shown in FIGS. 5a and 5b, for forming the film guidance element 5 the front wall 52 is placed on the rear wall 51 and the circumferential wall 53 applied to it, wherein the front wall 52 is spaced apart from the rear wall 51 by the circumferential wall 53 and is connected with it in an air-tight manner, for example by laser welding, so that an air chamber 54, closed on all sides, is formed between the rear wall 51 and the front wall 52 and delimited by the circumferential wall 53 within the housing thus formed by the rear wall 51, the circumferential wall 53 and the front wall 52.

Also, the air chamber 54 is divided by further intermediate strips 58, between which openings 57 are formed, into partial air chambers of approximately equal size, which communicate with each other through the openings 57, which extend uniformly over the entire interior of the air chamber 54. The intermediate strips 58 are also preferably produced together with the circumferential wall 53 by milling, such as integrally connected with the rear wall 51.

Also, an air inlet opening 55 formed as a bore with an associated connecting sleeve is in the area of the rear wall 51, through which an air flow E1 can be introduced into the interior of the air chamber 54. The front wall 52 of the film guidance element 5 facing the film bubble 4 when operated has a multitude of air outlet openings 52b, which are uniformly distributed over the entire surface, for example in a grid pattern, of which a single opening 52b is shown by way of example with a greatly increased diameter in FIG. 5b. For example, the arrangement of the air outlet openings 52b in a grid pattern distribution is indicated in greater detail in FIG. 5a in the partial air chamber located at the extreme right. The air flow previously introduced via the air inlet opening 55 into the air chamber 54 in accordance with the arrow E1 then again exits in the form of partial air flows through a respective air outlet opening 52b in the front wall 52 out of the air chamber 54, wherein the air chamber 54 is used for distributing the air over individual air outlet openings 52b.

Figure 8:
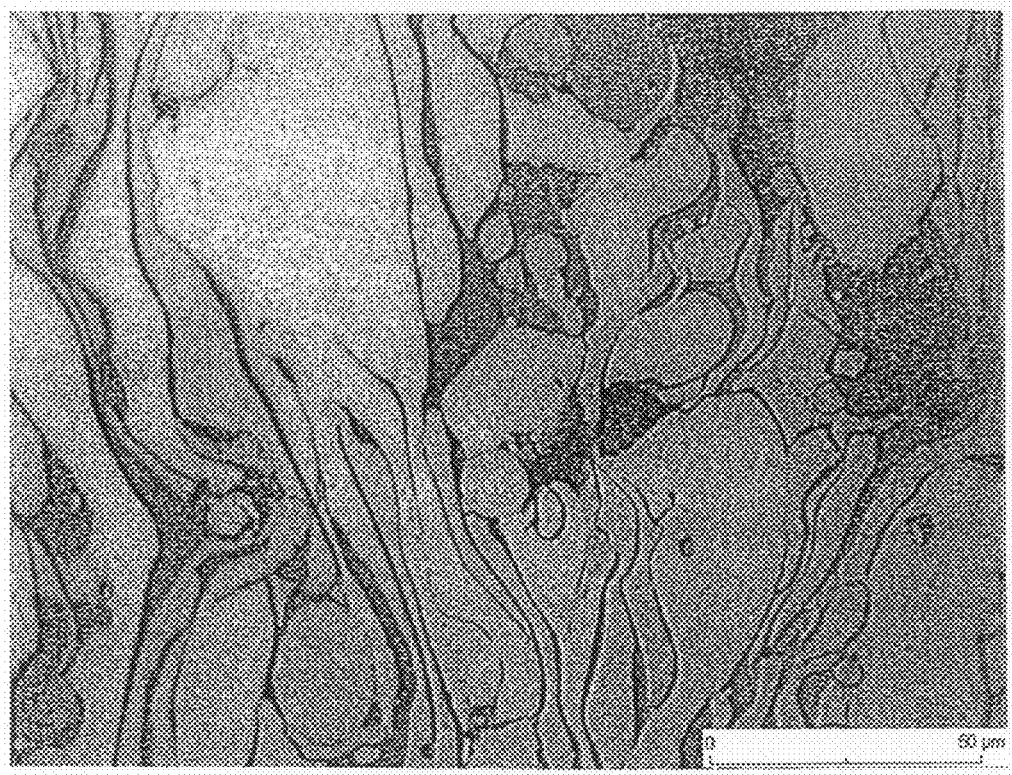
FIG. 8 is a scanning electron microscope photograph of a portion of the representation in accordance with FIG. 7.

An essential characteristic of the film guidance element 5 thus embodied is that another air-permeable microporous layer 15 is applied to the surface 52a of the front wall 52 facing the film bubble 4, which is shown in greater detail in the microscopic photographs in accordance with FIG. 7 and FIG. 8. This microporous air-permeable layer 15 can be produced, for example, on the basis of a powder mixture of several components with different melting temperatures, for example on the basis of metal and ceramic components, and is distinguished by an extraordinarily finely distributed arrangement of micropores 150, which have a mean pore diameter of approximately 5 to 100 μm, preferably 30 to 100 μm. The microporous layer is applied at a thickness d1 of 0.5 to 2.0 mm to the front wall 52 and forms the surface of the film guidance element 5 located directly opposite the surface of the film bubble 4.

As shown in FIG. 7, it is possible to see next to the dark areas identified by the reference numeral 15, which are impermeable to air, closely adjoining irregular and light-colored micropores identified by the reference numeral 150. The embodiment shown in FIG. 7 is seen through a microscope with 100-times magnification.

The irregular and dark-colored pores of approximately 5 to 100 μm, preferably 30 to 100 μm, are also shown in the microporous layer in FIG. 8, made by a scanning electron microscope, in contrast to the lighter metal substrate of the microporous layer 15.

Thus, the air flow entering the air chamber 54 via the air inlet opening 55 in the rear wall 51 in accordance with the arrow E1 enters through the air outlet openings 52b in the front wall 52 of the housing 50, the microporous layer 15 applied to the latter and is conducted from there through the individual, irregular and closely adjoining micropores 150 to the outer surface of the microporous layer 15, which is located directly opposite the film bubble 4. Then the air flow exits from the pores 150 in the form of minutest micro air flows E3 wherein, because of the narrow pore size of only 5 to 100 μm of the pores 150, preferably only 30 to 100 μm, the micro air flows E3 exit in the form of laminar partial air flows with a clearly reduced speed in comparison to the entering air flow E1 and therefore together form a laminar air cushion 22 at the surface of the microporous layer 15 between the film bubble 4 and the film guidance elements 5, by which the film bubble 4 is guided in a contactless manner between the individual film guidance elements 5 of the calibrating arrangement 2.

The microporous layer 15 applied to the exterior of the housing 50 of the film guidance elements 5 is used to divide the air flow E2, which is supplied at high speed via the air outlet openings 52b, into a multitude of laminar minute air flows E3 and to let it exit from the finely distributed pores of a mean pore size of 5 to 100 μm, preferably 30 to 100 μm, so that as a result a laminar air cushion is generated at the surface of the film guidance element 5 facing the film bubble 4.

The operating range of the supplied air flow E1 of such a film guidance element 5 lies, depending on the product being worked, for example the produced tubular film web, at approximately 0.5 to 4 bar. If the film guidance element 5 is charged with an air flow E1 at an overpressure of 0.5 bar, an air consumption of approximately 0.2 l/min dm$^2$ results, such as this amount of air exits from the microporous layer 15 in the form of minute air flows. When charged with an air flow E1 of 4 bar overpressure, the air consumption is correspondingly approximately 1.6 l/min dm$^2$.

Therefore, in summary the production of the film guidance element 5 occurs as now described.

Initially, the partial air chambers of the subsequent air chamber 54 are machined, for example out of a metal sheet of 2 mm thickness, while leaving the circumferential wall 53 and the intermediate strips 56, to a depth of approximately 1 mm, so that a continuous rear wall 51 of a thickness of approximately 1 mm also remains.

Then the front wall 52, also approximately 2 mm thick, with the already formed air outlet openings 52b is placed on the housing 50 thus produced and is welded all around and in an air-tight manner to the intermediate wall 53, for example is laser-welded.

Once placed, the front wall 52 is also fastened to the intermediate strips 56 by spot welding in order to increase the stability.

Now the front side of the front wall facing away from the rear wall 51 is ground for removing possibly existing weld seams, and then the mentioned microporous layer 15 of an approximate thickness of 1 mm can be applied.

So that a calibration as precise as possible and extending over the entire surface of the circumference of the film bubble 4 within the calibrating arrangement 2 is caused, the individual film guidance elements 5 have a housing 50, as well as a microporous layer 15 applied to the front wall 52 of the housing 50 which, differing from the representation in FIGS. 4a to 4c, 5a and 5b, has a concave curvature matching the circumference of the film bubble 4, so that ideally they can be brought against the circumference of the film bubble 4, completely enclosing it wherein the gap for forming the air cushion 22 required for the contactless guidance of the film bubble 4 is maintained.

Because of the required layer of little thickness d1 of the microporous layer 15 of only 0.5 to 2 mm, the concavely curved surface can be directly created by applying it to the housing 50 which already has the desired curvature. However, alternatively and preferably the housing 50 already provided with the microporous layer 15 is deformed from its straight, flat extension to such a degree that the desired curvature is present. The microporous layer permits such a deformation without the loss of its desirable porosity. Thereafter the connection of the housing with the fastening flange 58 is performed, for example by welding.

For matching the calibrating arrangement 2 to the existing process requirement, in a known manner it has a height adjustment in the direction of the arrow H, as well as a diameter adjustment in the direction of the arrow D. Various diameter settings are shown in FIG. 6.

All of the film guidance elements 5 arranged inside the calibrating arrangement 2 on support arms 21 are supplied via a common supply line 23 with the air flow E1, which is distributed inside the calibrating arrangement 2 to the individual air inlet openings 55 of the film guidance elements 5.

Figure 2:
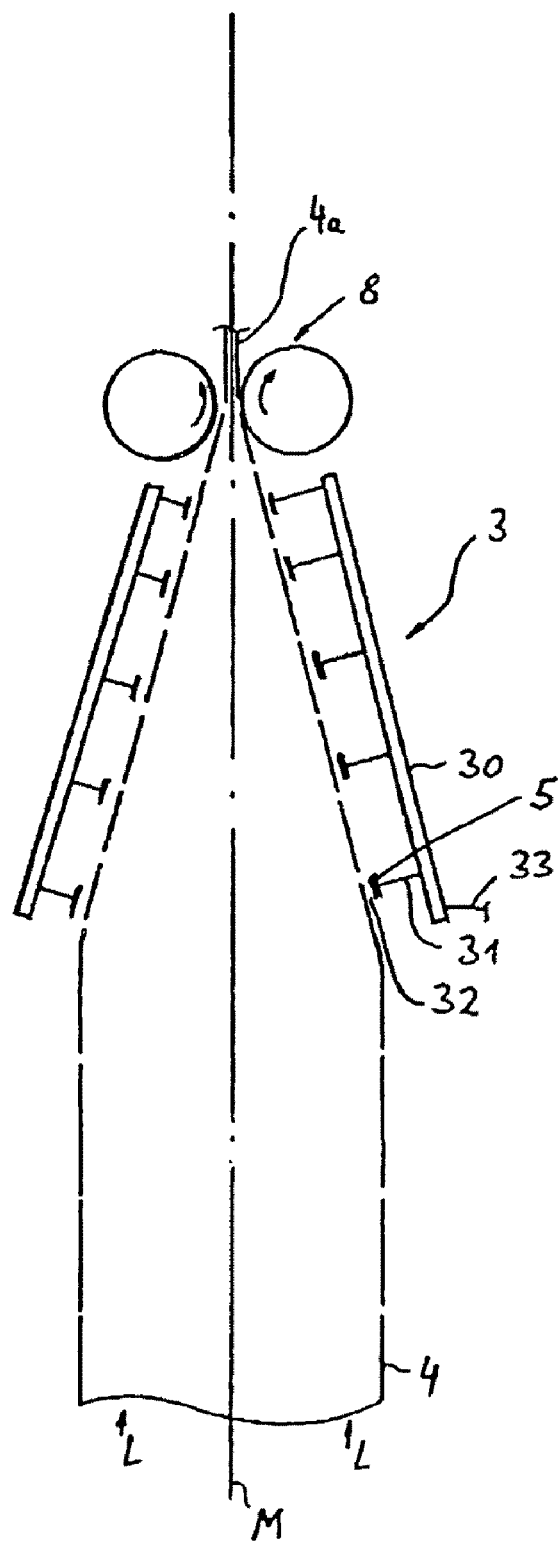
FIG. 2 shows a device in the area of its flattening device in a continuation of the representation in accordance with FIG. 1.
Figure 3A:
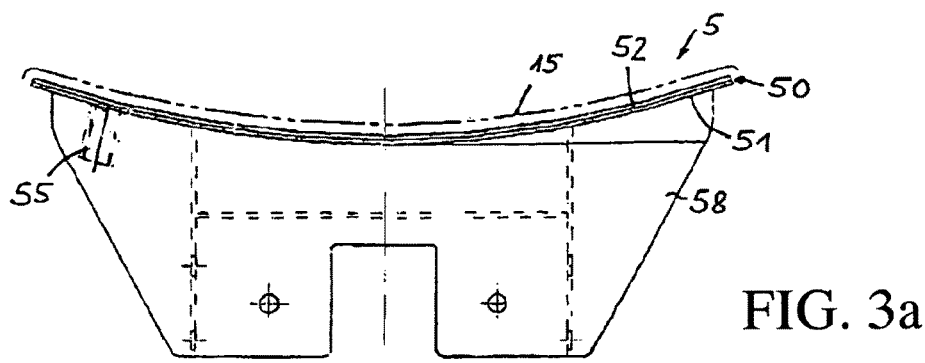
FIGS. 3a to 3d represent various views of a film guide element inserted into the flattening device in accordance with FIG. 1.
Figure 3B:
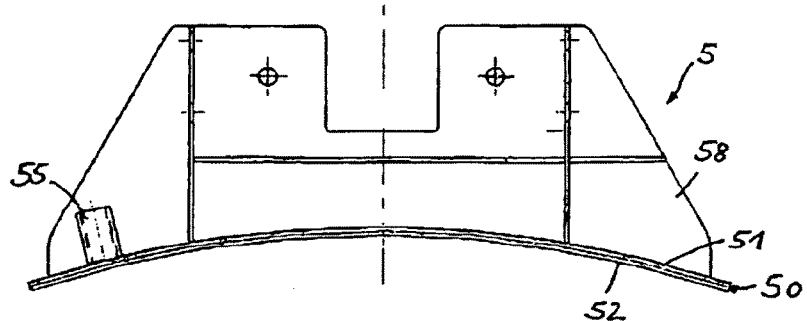
Figure 3C:
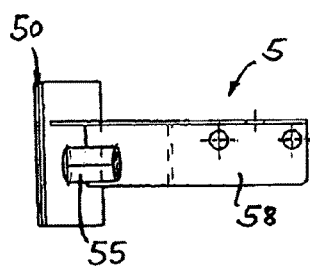
Figure 3D:
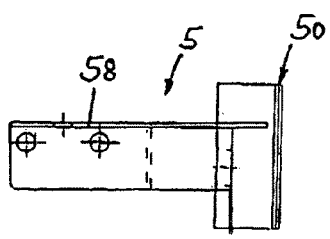

Besides the above described employment of the film guidance elements 5 for the contactless calibration of the film bubble 4 within a calibrating arrangement 2, it is also possible to use the film guidance elements 5 for the contactless flattening of the previously calibrated film bubble 4 within such a device, the further details of which are shown in FIG. 2.

In a known manner, a flattening device 3 adjoins the calibrating arrangement 2 in the outlet and conveyance direction L of the film bubble 4, in which the film bubble 4, previously calibrated to its exterior diameter and slowly solidifying, is laid flat prior to its passage through a pair of pinch-off rollers 8, so that then it can be conveyed in the form of a flattened double film web 4a to a winding device, not shown. As contactless as possible a guidance and flattening of the film bubble 4 is also desirable in the case of such a flattening device.

For this purpose, the flattening device has two flattening frames 30 arranged at an appropriate angle at opposite sides of the film bubble 4, to which support arms 31 are also fastened which, on their free end facing the film bubble 4, have respective film guidance elements 5 of the already described type. The film guidance elements 5 employed in the flattening device 3 extend flat as shown in FIGS. 4a to 4c, 5a, 5b and extend over the entire width of the double film web 4a to be flattened. Regarding their further design, reference is made to the above explanations.

Each film guidance element 5 again has an air inlet opening 55 for the air flow E1, which is conveyed to all via a supply line 33 to the flattening device 3.

In both embodiments, that of the calibrating arrangement 2 and/or the flattening device 3, a completely contactless calibration or flattening of the film bubble 4 is provided by the construction of the film guidance elements 5 with an air-permeable microporous layer 15 applied to the side facing the film bubble 4, from which laminar partial flows issue and create a laminar air cushion 22 or 32 for the contactless guidance of the film bubble 4.

Thus such calibrating arrangements 2 and flattening devices 3 can also be used for the guidance, calibration or flattening of strongly adhesive film bubbles 4, for example when producing composite EVA structures, composite PIB structures, composite structures with ionomers in PE-LLD films, without adhesion at the film guidance elements 5 occurring.

For example, its is possible to produce surface protection films made of co-extruded composite EVA structures with a large VA proportion, stretch films made of co-extruded composite PE-LLD structures with PIB, or composite metallocene structures and high-quality films, completely free of scratches and meeting high visual requirements.

Since the microporous layer 15 of this invention is preferably produced on the basis of metal and ceramic components and is applied to the housing 50 in the area of the front face 52 thereof, it is possible by known methods to place it on the previously produced housing 50 near or in the area of the front wall 52 and to bring it thereafter into the desired shape, for example by grinding.

The film guidance elements proposed within the scope of this invention are distinguished, beside their microporous layer for generating the laminar air cushion, particularly by their compactness which, for example, with a total thickness of at most 5 mm, inclusive of the microporous layer, provides the formation of a uniform air cushion for calibrating and flattening applications in film extrusion.

German Patent References DE 203 09 429.8 and DE 103 41 508.4, the priority documents corresponding to this invention, and their teachings are incorporated, by reference, into this specification.

What is claimed is:

1. A method for producing a film made of a thermoplastic material, wherein a melt of a plastic material exits from a blow head (1) supplied by at least one extruder while forming a film bubble (4) and then the film bubble (4) passes through a calibrating device (2) in which the film bubble (4) is calibrated to a predetermined diameter and then is flattened into a film web (4a) in a flattening device (3), wherein at least one of the calibrating device (2) and the flattening device (3) have a plurality of film guidance elements (5) each spaced apart from an adjacent film guidance element (5) and each guiding the film bubble (4) on an exterior, wherein the film guidance elements (5) are charged with an air flow exiting from a side of the film guidance elements (5) facing the film bubble (4) and forming an air cushion between the film bubble (4) and the film guidance elements (5) for a contactless guidance of the film bubble (4), the method comprising the air flow exiting in a laminar air flow (E3) form from the surface of each of the film guidance elements (5) facing the film bubble (4) and forming a laminar air cushion for the film bubble (4).

2. The method in accordance with claim 1, wherein the surface of each of the film guidance elements (5) facing the film bubble (4) is formed by an air-permeable microporous layer (15), and the air flow supplied to the film guidance elements (5) passes through the microporous layers (15), wherein the microporous layers (15) divide the air flow into a plurality of laminar partial air flows each exiting through individual pores (150) of each of the microporous layers (15) in a direction toward the film bubble (4) and forms the laminar air cushion.

3. The method in accordance with claim 2, wherein the air-permeable microporous layer (15) has a mean pore size of 5 to 100 μm 4. The method in accordance with claim 3, wherein when charged with an air flow of 0.5 to 4 bar, the film guidance elements (5) have an air flow in the direction toward the film bubble (4) corresponding to 0.2 (l/min/dm$^2$ at 0.5 bar, and up to 1.6 (l/min/dm$^2$ at 4 bar.

5. The method in accordance with claim 1, wherein when charged with an air flow of 0.5 to 4 bar, the film guidance elements (5) have an air flow m the direction toward the film bubble (4) corresponding to 0.2 (l/min/dm$^2$ at 0.5 bar, and up to 1.6 (l/min)/dm$^2$ at 4 bar.

6. A method for producing a film made of a thermoplastic material, wherein a melt of a plastic material exits from a blow head (1) supplied by at least one extruder while forming a film bubble (4), the method comprising:
    passing the film bubble (4) through a calibrating device (2) in which the film bubble (4) is calibrated to a predetermined diameter;
    flattening the film bubble (4) into a film web (4a) in a flattening device (3);
    supplying an air flow to each of a plurality of individual film guidance elements (5) of at least one of the calibrating device (2) or the flattening device (3), wherein each of the plurality of film guidance elements (5) is spaced apart from an adjacent film guidance element (5) and has a microporous layer facing the film bubble (4);
    forming a laminar air cushion between the film bubble (4) and the film guidance elements (5) for a contactless guidance of the film bubble (4) by an air flow exiting in a laminar air flow (E3) form from the microporous layer of each of the film guidance elements (5); and
    guiding the film bubble (4) by the air flow.

7. The method in accordance with claim 6, and the air flow supplied to each of the film guidance elements (5) passes through the microporous layer (15) and is divided into a plurality of laminar partial air flows each exiting through individual pores (150) of the microporous layer (15) in a direction toward the film bubble (4) to form the laminar air cushion.

8. The method in accordance with claim 6, wherein each air-permeable microporous layer (15) has a mean pore size of 5 to 100 μm.

9. The method in accordance with claim 8, wherein when charged with an air flow of 0.5 to 4 bar, the film guidance elements (5) have an air flow in the direction toward the film bubble (4) corresponding to 0.2 (l/min)/dm$^2$ at 0.5 bar, and up to 1.6 (l/min)/dm$^2$ at 4 bar.

10. The method in accordance with claim 6, wherein when charged with an air flow of 0.5 to 4 bar, the film guidance elements (5) have an air flow in the direction toward the film bubble (4) corresponding to 0.2 (l/min)/dm$^2$ at 0.5 bar, and up to 1.6 (l/min)/dm$^2$ at 4 bar.

* * * * *